United States Patent [19]

Takasu

[11] 3,924,478
[45] *Dec. 9, 1975

[54] SPEED REDUCTION MECHANISM
[75] Inventor: Isamu Takasu, Tokyo, Japan
[73] Assignee: Toyo Glass Machinery Company, Ltd., Japan
[ * ] Notice: The portion of the term of this patent subsequent to Sept. 9, 1992, has been disclaimed.
[22] Filed: Jan. 30, 1974
[21] Appl. No.: 437,787

Related U.S. Application Data
[63] Continuation of Ser. No. 416,104, Nov. 15, 1973.

[30] Foreign Application Priority Data
Nov. 18, 1972 Japan............................. 47-115244

[52] U.S. Cl....................................... 74/63; 74/116
[51] Int. Cl.[2]........................................ F16H 21/12
[58] Field of Search........................ 74/63, 116, 122

[56] References Cited
UNITED STATES PATENTS
2,704,459    3/1955    Nanni ...................................... 74/63

Primary Examiner—Samuel Scott
Assistant Examiner—Wesley S. Ratliff, Jr.
Attorney, Agent, or Firm—Robert E. Burns; Emmanuel J. Lobato; Bruce L. Adams

[57] ABSTRACT

A speed reducer effecting speed reduction without gears and having an eccentric with a driving disc mounted freely for rotation on the eccentric. The disc has a plurality of elongated driving lugs or studs arranged in a first circle and extending generally in a common direction parallel to the axis of rotation of the speed reducer. A driven output member constructed as an output shaft with a driven flange or disc is rotatable about the axis of rotation and it has a plurality of elongated driven lugs or studs arranged in a second circle circumferentially of the first circle. The driven lugs or studs are greater in number than the driving lugs. As the input rotation is applied to the speed reducer the driving disc has imparted thereto an eccentric circular motion but it is constrained from rotating about the eccentric or axis of rotation. As it makes its circular motion the individual driving lugs thereof periodically and successively make tangential contact with the driven lugs and impart rotation thereto in a corresponding direction of rotation so that the driven disc and shaft rotate at a lesser speed of rotation than the input speed of rotation.

5 Claims, 5 Drawing Figures

SPEED REDUCTION MECHANISM

This is a continuation of my application Ser. No. 416,104 filed Nov. 15, 1973.

BACKGROUND OF THE INVENTION

The present invention relates to speed reduction mechanism and more particularly to a new and improved speed reducer that uses no gears in its power transmission system.

Speed reducers of various types are known. Generally the known speed reduction mechanisms have gear systems therein that are difficult to construct, they require making of the gears, and accordingly are relatively expensive and complex.

SUMMARY OF THE INVENTION

It is a primary object of the invention to provide a speed reduction mechanism of a type in which no gears are used in transmission of power from the input to the output.

Another object is to provide a speed reduction mechanism which is compact and inexpensive to manufacture in view of the absence of gears therein.

Another object is to provide a speed reducer capable of functioning with a low power input and with a low noise level.

Still another object of the present invention is to provide a speed reduction mechanism which can smoothly transmit power from a driving or input shaft to an output or driven member and which operates with extremely low power loss and noise.

A speed reducer according to the invention comprises a driven output shaft having a flange or disc surface mounting a plurality of driven lugs arranged in a first circle angularly spaced from each other and extending in a common direction parallel to the axis of rotation. Driving means have driving eccentric means eccentric to its center and whose center is displaced from the axis of rotation of the driven output shaft. A driving disc is mounted for circular movement on the eccentric means without rotation about the axis of rotation of the speed reducer. The disc has a second plurality of driving lugs disposed in a second circle of lesser diameter than the first circle, internally thereof, and extending in a common direction. The second plurality of lugs are less in number than the first plurality of lugs. This second plurality of lugs has the lugs disposed for successive ones of the driving lugs thereof engaging periodically, during eccentric movement of the disc, lugs of the first plurality of lugs for imparting thereto movement in a corresponding direction. The driven shaft is accordingly driven rotationally at a speed substantially less than the speed of rotation of an input shaft.

BRIEF DESCRIPTION OF THE DRAWINGS

Other features and advantages of the speed reduction mechanism according to the invention will be apparent from the disclosure and appended claims and drawings in which:

DESCRIPTION OF THE PREFERRED EMBODIMENT

Figure 1:
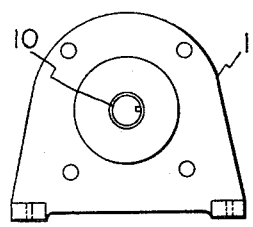
FIG. 1A is a front elevation view of a speed reduction mechanism according to the invention.
FIG. 1B is a side elevation view of the mechanism in FIG. 1A.
Figure 1:
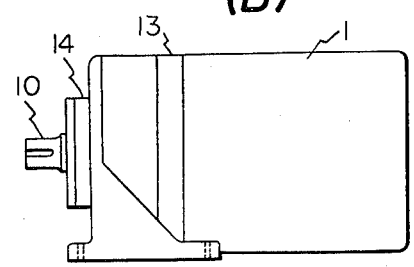
Figure 2:
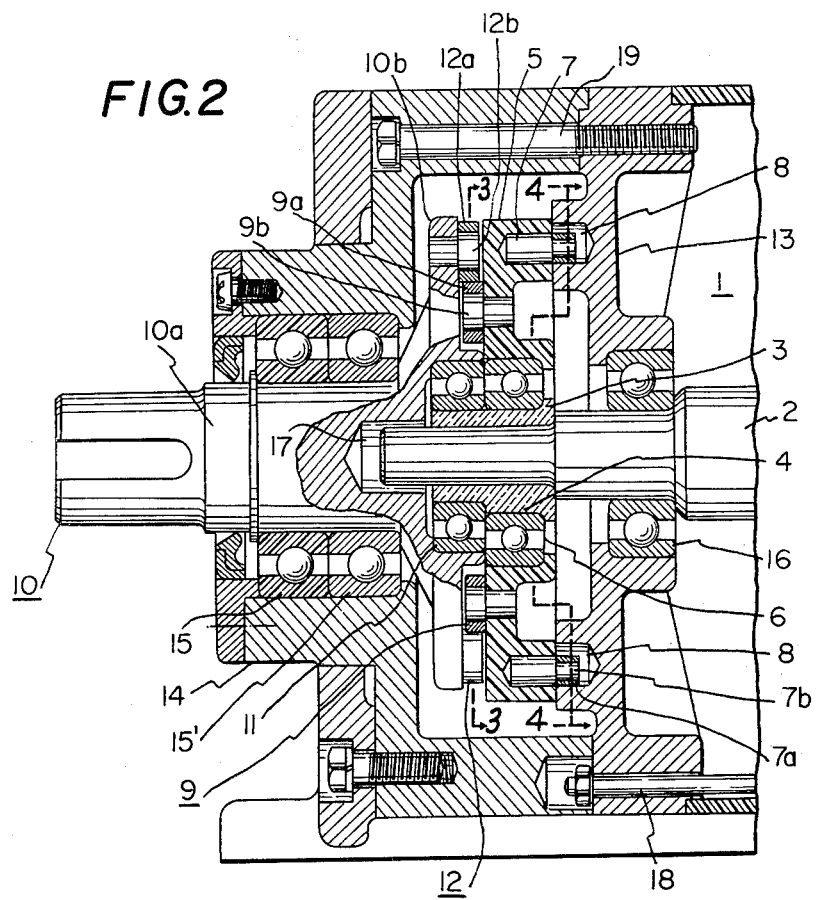
FIG. 2 is a fragmentary longitudinal section view of the speed reduction mechanism in FIG. 1B.

The speed reducer or speed reduction mechanism according to the invention illustrated in the drawings comprises a prime mover 1 having a driving or input shaft 2 driving a boss 3 having an eccentric or eccentric boss 4 integral therewith. The eccentric has a center C displaced a distance S from the center $C_o$ or axis of rotation of the driving shaft 2 and therefore the axis of rotation of the apparatus.

An intermediate disc 5 is mounted for rotation on the eccentric 4 by a bearing 6. The intermediate disc 5 carries out a "circular" movement when the eccentric is rotatably driven but is restrained from rotation $C_o$ about the axis of rotation by restraining and guide lugs 7 fitting loosely within stationary guide holes or openings 8. The restraining and guide lugs 7 are constructed as rollers 7a mounted rotatably on pin portions 7b on one side of disc 5. The intermediate disc 5 is provided on the other side thereof with elongated driving lugs or studs 9 disposed extending in a common direction parallel to the axis of rotation and equally spaced in a circle coaxial with the center C of the eccentric. Each of the driving lugs 9 comprises a roller 9a rotatably mounted on a pin portion 9b.

A driven or output shaft 10 is mounted coaxial with the driving shaft by means of a bearing 11 on the boss 3. The driven shaft has a shaft portion 10a and a driven disc 10b integral with the shaft portion and disposed circumferentially of the coaxial bearing 11. The driven disc 10b has a plurality of driven, elongated lugs 12 fixed thereon disposed extending in a common direction parallel to the axis of rotation and equally spaced in a circle coaxial with the axis of rotation and circumferentially of the circle of driving lugs. Each of the driven lugs comprises a roller 12a rotatably mounted on a pin portion 12b.

In order to effect a speed reduction there must be a larger number of driven lugs than driving lugs. In the example embodiment there are fifteen driven lugs and fourteen driving lugs. As a result of this a speed reduction ratio 15:1 is obtained as hereinafter explained.

As indicated heretofore the driving intermediate disc 5 is constrained from rotation about the axis of rotation by restraining lugs 7 extending into guide openings 8 of a stationary disc 13 which is securedly fixed to a frame member of the prime mover 1. The stationary disc 13 rotatably supports the driving shaft 2 and allows only the eccentric "circular" movement of the intermediate disc 5.

A bearing box 14 fixed to the stationary disc 13 rotatably supports the driven shaft 10 by means of a pair of bearings 15 and 15'.

A bearing 16 rotatably supports the driving shaft 2 which extends into a relief hole 17 in the driven disc 10b. The stationary disc is securely bolted to the prime mover by bolts 18 and the bearing box 14 is securely bolted to the stationary disc 13 by bolts 19.

The driving input shaft 2 is driven directly by means of the prime mover 1. Accordingly, the driving shaft boss 3 is rotated at the speed of the input mover. The eccentric 4 will rotate therewith and the intermediate disc member 5 is moved in motion which can be thought of as "circular" and is restricted from rotation because of the aforementioned arrangement of the restraining lugs 7 and associated guide holes 8. The disc 5 does not rotate but is permitted to move in a closed path within a range afforded by the clearance of the restraining lugs 7 in the guide holes 8.

The movement of the eccentric disc 5 causes the driving lugs 9 thereon to move such that each will successively be brought into operative engagement with the driven lugs 12 disposed circumferentially thereof and the driven lugs will be driven in a rotary motion. Accordingly, the driven disc member 10b and hence the output or driven shaft 10 are rotatably driven. As indicated heretofore by suitably selecting the number of lugs in each circle the driven shaft can be rotated at the desired speed with respect to that of the driving shaft boss 3. As indicated heretofore the relative or relative speeds or rotational speed ratio of the driving shaft boss 3 and the output shaft is 15:1.

Figure 3:
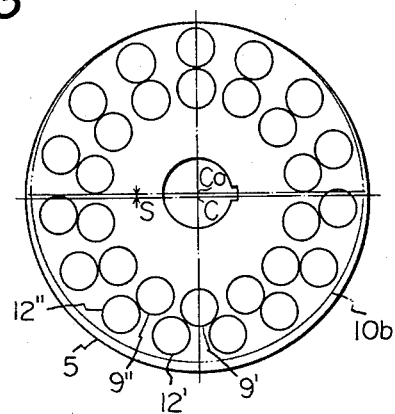
FIG. 3 is a diagrammatic view taken along section line 3—3 of FIG. 2.
Figure 4:
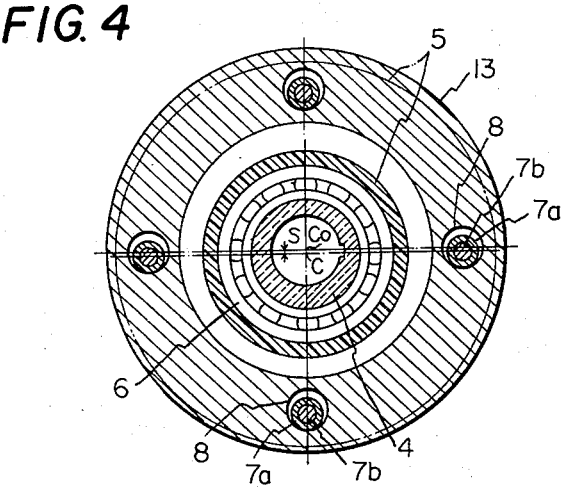
FIG. 4 is a section view taken along section line 4—4 of FIG. 2.

A better understanding of the manner in which the driving lugs that drive the driven lugs can be had from the diagrammatical illustration in FIG. 3. In the illustration in FIG. 3 the driving lugs 9 are being moved, but not rotated about axis C or Co, in a clockwise direction and are at their lowermost position and the eccentric disc 5 is at its lowermost position of the "circular" motion and thereof a driving lug 9' is tangentially in contact with two successive driven lugs 12' and the one to the right thereof. The contact is tangential to impart motion in a clockwise direction to a driven lug 12'. It can be seen that an adjacent driving lug 9'' is in contact with the driven lugs and imparts some rotary motion to a driven lug 12'' in a clockwise direction. In this manner the individual driving lugs are successively brought into operative engagement with two corresponding adjacent driven lugs 12 and drive the driven lugs in a clockwise direction. As a result of this the driven disc 10b is driven and hence the driven shaft 10 is made to rotate at a reduced speed.

The tangential contact is possible since the driving and driven lugs are disposed on circles with different centers and on different radii since there are a different number of studs in each circle. Moreover, the radii of the studs on the two circles are offset as it were. Because of the rotation of the eccentric and because of the sufficiency of the radii offset and the overall eccentricity from the axis of rotation of the apparatus the individual driving lugs will be "inserted" individually between two adjacent driven lugs into tangential contact with a driven lug to which the clockwise closed path movement, of the driving disc and driving lugs, is imparted. This takes place in sequential tangential contacts and the desired drive at a reduced speed takes place.

The ratio of speed reduction is the guotient obtained by dividing the difference between the number of the driven lugs and that of the driving lugs by the number of the driven lugs. Accordingly in the instant embodiment the ratio speed reduction is 1/15.

Those skilled in the art will understand that the apparatus can be constructed from suitable materials. The various rollers can be made of a suitable bearing steel and the apparatus will still be relatively quiet or silent in operation.

What I claim and desire to secure by letters patent:
1. A speed changer comprising;

a driving shaft defining an axis and disposed for rotation at a first speed about said axis;

an eccentric boss secured to and rotatable with the shaft;

an intermediate disc pivoted on said boss, locked against rotation, and mounted for circular movement in a closed path;

means for converting the rotation of said boss into the circular movement of the disc;

a driven disc mounted for rotation about said axis of said shaft; and means for converting the circular movement of the disc into rotation of the driven disc at a speed different from said first speed, comprising a number of first lugs mounted on one of said discs and equally circumferentially spaced apart to define a first circle, a different number of second lugs mounted on the other disc and equally circumferentially spaced apart to define a second circle, one of said circles being disposed generally within the other, and the first and second lugs being disposed to approximately tangentially bear on one another individually and sequentially in driving contact of the lugs on the intermediate disc with the lugs on the driven disc.

2. A speed changer, comprising;

a driving shaft defining an axis and disposed for rotation at a first speed about said axis; an eccentric boss secured to and rotatable with the shaft;

an intermediate disc pivoted on said boss;

means for locking the intermediate disc against rotation, comprising a stationary disc disposed opposite the intermediate disc in mutually facing relationship; a number of pin-and-aperture means on said discs in mutually facing relationship for enabling said pin-and-aperture means to perform circular movements relative to one another and thereby to mount the intermediate disc for circular movement in a closed path;

a driven disc mounted for rotation about said axis; and means for converting the circular movement of the intermediate disc into rotation of the driven disc at a speed different from said first speed, comprising a number of first lugs mounted on one of the intermediate and driven discs and equally circumferentially spaced apart to define a first circle, a different number of second lugs mounted on the other of said intermediate and driven discs and equally circumferentially spaced apart to define a second circle, one of said circles being disposed generally within the other, and the first and second lugs being disposed to approximately tangentially bear on one another individually and sequentially in driving contact of the lugs on the intermediate disc with the lugs on the driven disc.

3. A speed changer according to claim 2, comprising a housing which includes said stationary disc and wall means surrounding said intermediate and driven discs.

4. A speed changer according to claim 3 wherein said housing also includes a fourth disc, peripherally secured to said wall means and facing said driven disc.

5. A speed changer according to claim 4 including antifriction bearing means for said driving shaft disposed centrally of said third disc.

* * * * *